(12) United States Patent
Leblang (10) Patent No.: US 9,560,045 B1
(45) Date of Patent: *Jan. 31, 2017

(54) SECURING CONTENT USING A WIRELESS AUTHENTICATION FACTOR

(71) Applicant: Amazon Technologies, Inc., Seattle, WA (US)

(72) Inventor: Jonathan A. Leblang, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 70 days.

This patent is subject to a terminal disclaimer.

(21) Appl. No.: 14/519,929

(22) Filed: Oct. 21, 2014

Related U.S. Application Data (63) Continuation of application No. 12/720,275, filed on Mar. 9, 2010, now Pat. No. 8,866,581.

(51) Int. Cl.
| | |
|---|---|
| *G08B 19/00* | (2006.01) |
| *G08B 1/08* | (2006.01) |
| *H04Q 5/22* | (2006.01) |
| *G06F 21/00* | (2013.01) |
| *G06F 15/16* | (2006.01) |
| *H04L 29/06* | (2006.01) |
| *H04W 12/08* | (2009.01) |

(52) U.S. Cl.
CPC ....... *H04L 63/0869* (2013.01); *H04L 63/0861* (2013.01); *H04W 12/08* (2013.01)

(58) Field of Classification Search
CPC ............................. G06F 21/14; H04W 76/021
See application file for complete search history.

(56) References Cited

U.S. PATENT DOCUMENTS

| | | | |
|---|---|---|---|
| 6,493,734 B1 | 12/2002 | Sachs et al. | |
| 6,851,822 B2 | 2/2005 | Herrera | |
| 6,871,063 B1 * | 3/2005 | Schiffer | G06F 21/35 455/269 |
| 6,876,295 B1 | 4/2005 | Lewis | |
| 6,931,538 B1 | 8/2005 | Sawaguchi | |
| 7,065,557 B2 | 6/2006 | Sowden et al. | |
| 7,154,452 B2 | 12/2006 | Nakamura et al. | |
| 7,298,851 B1 | 11/2007 | Hendricks et al. | |
| 7,570,164 B2 | 8/2009 | Chakraborty et al. | |
| 7,748,634 B1 | 7/2010 | Zehr et al. | |
| 7,797,549 B2 | 9/2010 | Main et al. | |
| 7,916,175 B2 | 3/2011 | Yamakita | |
| 7,965,873 B2 | 6/2011 | Goto | |
| 8,047,670 B2 | 11/2011 | Patrick et al. | |
| 8,169,447 B2 | 5/2012 | Bhogal et al. | |

(Continued)

OTHER PUBLICATIONS

Final Office Action for U.S. Appl. No. 12/553,081, mailed on Oct. 24, 2013, John T. Kim, "Content Enabling Cover for Electronic Book Reader Devices", 48 pages.

(Continued)

*Primary Examiner* — Jennifer Mehmood
*Assistant Examiner* — Pameshanand Mahase
(74) *Attorney, Agent, or Firm* — Lee & Hayes, PLLC (57) ABSTRACT

A mobile device is described that stores and renders content. Access to certain content is predicated at least upon receiving a particular wireless signal from an external or separate device that has previously been associated with the mobile device or with content stored on the mobile device.

20 Claims, 5 Drawing Sheets

(56) References Cited

U.S. PATENT DOCUMENTS

| | | |
|---|---|---|
| 8,186,843 B2 | 5/2012 | Mish et al. |
| 2002/0087555 A1 | 7/2002 | Murata |
| 2002/0152215 A1 | 10/2002 | Clark et al. |
| 2002/0158601 A1 | 10/2002 | Kuo et al. |
| 2002/0177330 A1 | 11/2002 | Haffenden et al. |
| 2003/0069812 A1 | 4/2003 | Yuen et al. |
| 2003/0073326 A1 | 4/2003 | MacLaren et al. |
| 2003/0093312 A1 | 5/2003 | Ukita et al. |
| 2003/0100346 A1 | 5/2003 | Kostiainen |
| 2003/0135748 A1* | 7/2003 | Yamada ............ G06F 21/10 713/193 |
| 2003/0236102 A1 | 12/2003 | Kawai et al. |
| 2004/0059923 A1 | 3/2004 | ShamRao |
| 2004/0180657 A1* | 9/2004 | Yaqub ............ H04L 63/0853 455/435.1 |
| 2005/0026643 A1 | 2/2005 | White et al. |
| 2005/0138392 A1* | 6/2005 | Johnson ............ G06F 21/14 713/186 |
| 2005/0198208 A1 | 9/2005 | Nystrom |
| 2005/0215200 A1* | 9/2005 | Oesterling ........ H04W 48/16 455/66.1 |
| 2005/0227729 A1 | 10/2005 | Nakayama |
| 2006/0148454 A1 | 7/2006 | Welch |
| 2006/0149727 A1 | 7/2006 | Viitaharju |
| 2006/0194181 A1 | 8/2006 | Rosenberg |
| 2006/0279412 A1 | 12/2006 | Holland et al. |
| 2007/0088747 A1 | 4/2007 | Cheng et al. |
| 2007/0233538 A1* | 10/2007 | Zpevak ............ G06F 8/71 705/7.14 |
| 2008/0048837 A1 | 2/2008 | Montgomery et al. |
| 2008/0120312 A1 | 5/2008 | Reed et al. |
| 2008/0164304 A1 | 7/2008 | Narasimhan et al. |
| 2008/0168073 A1 | 7/2008 | Siegel et al. |
| 2008/0243991 A1 | 10/2008 | Ryan et al. |
| 2008/0268415 A1 | 10/2008 | Kwong |
| 2008/0298083 A1 | 12/2008 | Watson et al. |
| 2009/0134973 A1 | 5/2009 | Sandler et al. |
| 2009/0150553 A1 | 6/2009 | Collart et al. |
| 2009/0204663 A1* | 8/2009 | Patwari ............ H04N 7/17318 709/203 |
| 2009/0219271 A1 | 9/2009 | Bandel et al. |
| 2009/0292643 A1 | 11/2009 | Wu |
| 2010/0010914 A1 | 1/2010 | Park |
| 2010/0036934 A1 | 2/2010 | Bruster |
| 2010/0052863 A1 | 3/2010 | Renfro, Jr. et al. |
| 2010/0141689 A1 | 6/2010 | Johnson |
| 2010/0149739 A1 | 6/2010 | Mish et al. |
| 2010/0181450 A1 | 7/2010 | Hulick et al. |
| 2010/0251358 A1 | 9/2010 | Kobayashi et al. |
| 2010/0283690 A1 | 11/2010 | Artigue et al. |
| 2011/0050394 A1* | 3/2011 | Zhang ............ G06F 3/045 340/5.82 |
| 2011/0187505 A1 | 8/2011 | Faith et al. |
| 2011/0307823 A1 | 12/2011 | Wu |
| 2012/0031786 A1 | 2/2012 | Mish et al. |
| 2012/0139693 A1 | 6/2012 | Zucker et al. |
| 2012/0194322 A1 | 8/2012 | Batra |
| 2013/0208414 A1 | 8/2013 | Moser |
| 2014/0323053 A1 | 10/2014 | Yamaoka et al. |
| 2015/0070329 A1 | 3/2015 | Bouchard |

OTHER PUBLICATIONS

Final Office Action for U.S. Appl. No. 12/720,275, mailed on Jan. 29, 2014, Jonathan A. Leblang, "Securing Content Using a Wireless Authentication Factor", 12 pages.

Non-Final Office Action for U.S. Appl. No. 12/553,081, mailed on Nov. 14, 2011, John T. Kim, "Content Enabling Cover for Electronic Book Reader Devices", 38 pages.

Office action for U.S. Appl. No. 12/553,081, mailed on Apr. 10, 2013, Kim et al., "Content Enabling Cover for Electronic Book Reader Devices", 37 pages.

Non-Final Office Action for U.S. Appl. No. 12/553,081, mailed on Jul. 19, 2012, John T. Kim, "Content Enabling Cover for Electronic Book Reader Devices", 37 pages.

Final Office Action for U.S. Appl. No. 12/553,081, mailed on Oct. 24, 2014, John T. Kim, "Content Enabling Cover for Electronic Book Reader Devices", 36 pages.

Office Action for U.S. Appl. No. 12/553,081, mailed on Mar. 13, 2015, John T. Kim, "Content Enabling Cover for Electronic Book Reader Devices", 13 pages.

Wikipedia, Universal Serial Bus, retrieved on Feb. 24, 2015 at <<https://web.archive.org/web/20081205025804/http://en.wikipedia.org/wiki/USB>>, Wikipedia, Dec. 5, 2008, pp. 1-10.

* cited by examiner

SECURING CONTENT USING A WIRELESS AUTHENTICATION FACTOR

CROSS REFERENCE TO RELATED APPLICATIONS

This Application is a continuation of and claims priority to U.S. patent application Ser. No. 12/720,275, filed Mar. 9, 2010 which is incorporated herein by reference.

BACKGROUND

A large and growing population of users is enjoying entertainment through the consumption of digital media items, such as music, movies, images, electronic books, and so on. The users employ various electronic devices to consume such media items. Among these electronic devices are electronic book ("eBook") readers, cellular telephones, personal digital assistants (PDAs), portable media players, tablet computers, netbooks, and the like.

These electronic devices often use some sort of password-based protection mechanism in order to prevent unauthorized users from accessing content stored on or accessed through the electronic devices. In order to access content, a user is requested to enter an alphanumeric password. If the password matches a previously configured password, the user is allowed to access the content. Access is denied if the entered password does not match the previously configured password.

Simple password protection such as this is sufficient for many situations. However, password protection is notoriously weak, and subject to being broken by determined hackers. Furthermore, many users choose particularly weak passwords, such as their social security number, their birthday, the name of a family member, or some other phrase that can be eventually guessed by someone familiar with the user.

In order to increase the protection of sensitive data, two-factor authentication can be used. Two-factor authentication requires a user to supply two authentication factors rather than the previously mentioned single factor of a password. In two-factor authentication, one of the factors may be a password, but the other factor might consist of the user's possession of a particular hardware token or key.

As an example, an authorized user might be issued a specially configured USB device that stores information uniquely identifying the user. In order to use a computer or other device, the user may be asked to supply a password, and in addition to connect the USB device to the computer so that the computer can verify the information on the USB device that uniquely identifies the user. Thus, the user is asked to provide some type of knowledge or user secret, and also to prove physical possession of some type of unique token that has been specially prepared for the particular user.

The second factor can alternatively consist of some physical characteristic of the user, such as a fingerprint, a voice sample, or a retinal pattern. In this situation, the computer is equipped with hardware to sample the physical characteristic, such as a fingerprint reader, and verifies the user's fingerprint before determining the user to be authenticated.

Two-factor authentication is more secure, but is more difficult to configure than single-factor password authentication. In most cases, special hardware tokens are created and issued to each user. This can be expensive and inconvenient, and also requires that the user carry an additional, dedicated hardware device. In many cases, the user will simply connect or attach the hardware device to the electronic device and leave it there, which generally negates the effectiveness of the protection scheme.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed towards an authentication scheme for mobile devices such as handheld electronic book ("eBook") reader devices. For successful authentication, a user enters a pre-specified or configurable password. In addition, the mobile device detects whether it can receive a wireless signal from a separate electronic device belonging to the user. For example, the separate electronic device might be a headset, a cell phone, or a personal music player. The presence of a signal from the separate device is used as a second factor to authenticate the user. Thus, user authentication is predicated upon receiving the correct password from the user and upon receiving a signal from a device that has been pre-associated with the mobile device or with the user. In other implementations, meanwhile, authentication or access to content is predicated upon receiving biometric information and upon receiving the specified wireless signal.

Therefore, two authentication factors may be provided for authentication or for access to specified content: a user-possession factor (reception of a specified wireless signal), as well as a user-knowledge factor (the password) or a user-identity factor (biometric information). Of course, in each implementation the user may provide more than two factors for the purpose of authenticating or accessing the content.

Figure 1:
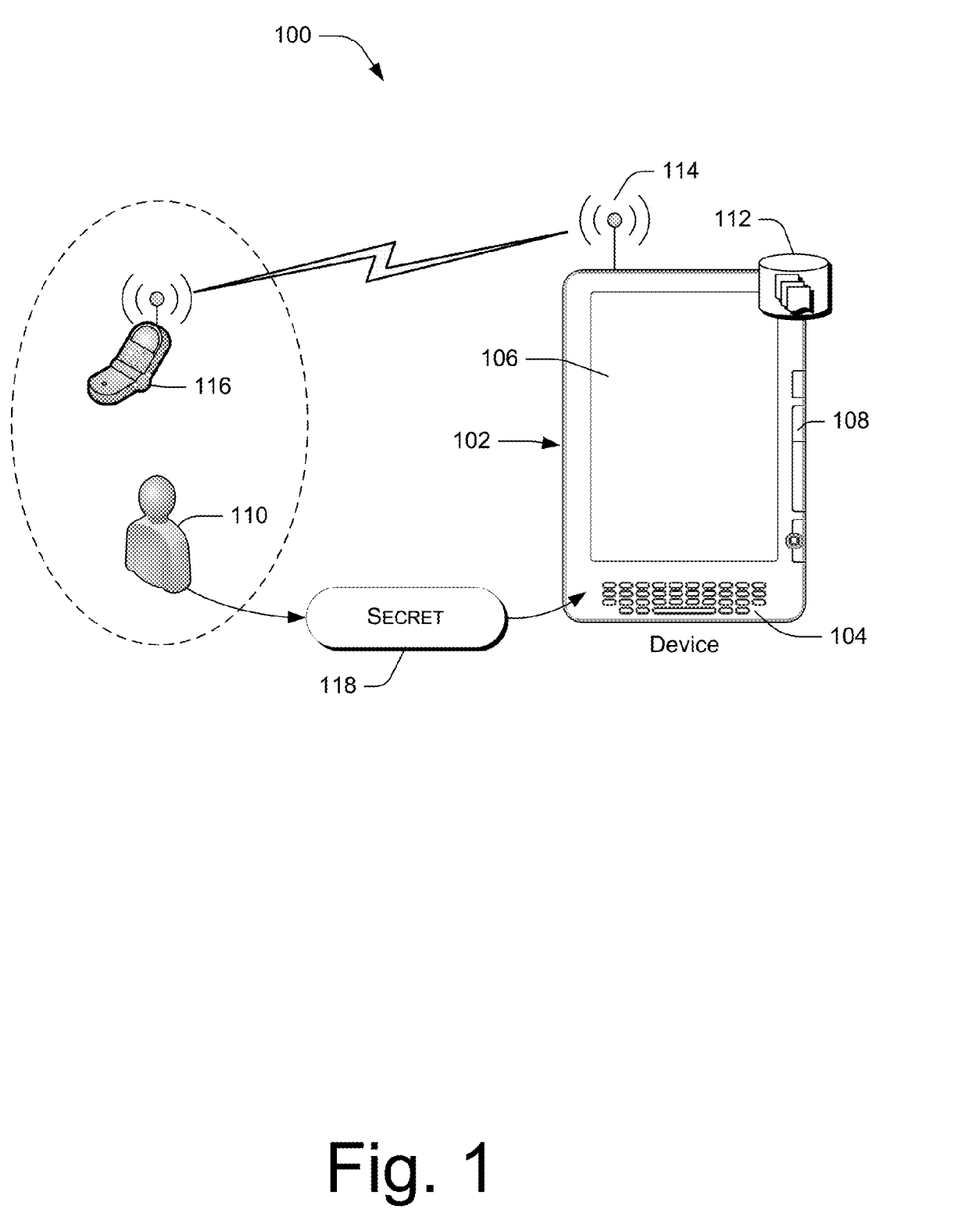
FIG. 1 is a block diagram illustrating one example implementation of an architecture in which a mobile device utilizes an external wireless device for user authentication.

FIG. 1 shows an environment 100 in which these techniques can be implemented and used. In this example, a mobile device 102 comprises a portable media device such as a dedicated eBook reader device. The mobile device 102 might alternatively comprise any other type of mobile or portable device, such as a cellular phone, a personal digital assistant, a personal music player, a tablet computer, a laptop computer, or any other portable device having resources or activities subject to protection from unauthorized users. Many such devices are considered personal to a specific user or to a small group of users. For example, an eBook reader device is often used exclusively by a single user or by a small group of users such as the primary user and his or her family. Small computers, music players, and other such devices are also often associated personally with particular users.

In this example, the mobile device 102 has a keyboard 104, a graphical display 106, and miscellaneous buttons or inputs 108. The keyboard 104 can be an alphanumeric keypad that a user can employ to enter text, numbers, and punctuation. The keyboard 104 can be used for various user input, including entry of passwords.

The display 106 is an example of a content rendering device upon which different content items can be displayed or otherwise rendered for a user. In addition, the display 106 can form a user interface for use in conjunction with the keyboard 104 to interact with a user 110 and allow the user 110 to navigate to different content items. Other content rendering devices might include speakers, headphones, or other types of displays. In addition, the display 106 might be touch-sensitive, allowing the user to touch the display itself in order to provide input, including alphanumeric input. In an embodiment using a touch-sensitive display surface, the keyboard 104 might be implemented as a virtual keypad on the touch-sensitive display 106, and passwords might be entered by touching the display surface 106.

The buttons 108 can be used for various user input functions, such as activating menus, turning pages, advancing to a subsequent song or media item, etc.

The mobile device 102 can store or have access to a plurality of media or content items, represented in FIG. 1 by symbol 112. Content items 112 can comprise a variety of different types of content, such as text, graphics, audio, video, contacts, notes, annotations, books, albums, files, etc. In the illustrated environment, where the mobile device 102 is an eBook reader device, the content items 112 might comprise eBooks, which in turn comprises text and graphics. Such eBooks might also include other types of media such as audio and video. Such media is rendered on the display 106 and/or other output devices such as audio speakers or headphones. Other content items rendered by an eBook reader device might comprise notes or other annotations (voice, textual, graphical, audio, or video) associated with particular eBook textual or graphical content. For purposes of this description, such notes or other annotations are considered to be separate content items from the primary content with which they might be associated.

In the particular embodiment illustrated by FIG. 1, the mobile device 102 has a wireless communications receiver or transceiver 114, represented in FIG. 1 by an antenna symbol. The wireless communications receiver or transceiver 114 is configured to communicate wirelessly with an external wireless communications device 116. The external wireless communications device 116 can be a personal and/or mobile device that belongs to or is associated with the user 110, such as the mobile phone shown in FIG. 1. The external wireless communications device 116 can be a personal electronic device that user 110 carries or has nearby, or a wireless device that has been pre-designated as being associated with the user 110. Examples of external wireless communications devices might include wireless headsets, other wireless accessories and audio devices, mobile telephones, personal media players, other eBook reader devices, digital storage devices, telephonic and other voice or data communications devices, access points, cell nodes, network devices, and other portable, mobile, or personal devices.

The wireless communications receiver or transceiver 114 can be a Bluetooth receiver or transceiver. Bluetooth technology and protocols are commonly used to connect with voice accessories such as headsets and hands-free automotive devices and are often used in conjunction with mobile telephonic devices. Many personal devices include Bluetooth wireless capabilities, including desktop computers, laptops and other small computers, smartphones, digital personal assistants, personal audio/media players, and so forth.

The wireless communications receiver or transceiver 114 can be a wireless local-area or wide-area network receiver, transceiver, or port, configured to communicate through a local-area or wide-area using conventional IP (Internet Protocol) and IP-related protocols for wireless network communications. Alternatively, the wireless communications receiver or transceiver 114 might be a cellular-based communications component or device such as used in mobile telephones or other personal communications devices. The receiver/transmitter 114 may also be configured to wirelessly interrogate objects for the presence of one or more RFID tags. The mobile device 102 may additionally or alternatively include any other technology capable of utilizing the use of RFID and/or RFID tags to detect the presence of associated external devices (e.g., mobile device, network component, etc.).

Note that the mobile device 102 might have two or more wireless communications receivers or transceivers 114, such as a network communications port and a Bluetooth port.

When a user attempts to access a particular content item 112, the mobile device 102 requests that the user enter a user secret 118, often referred to as a passcode or password. The password 118 can be preset within the mobile device 102, or can be configurable by the user 110. In most environments, the password comprises a sequence of alphanumeric and special characters, although other user secrets may be used. For instance, the user secret 118 could comprise selection of a particular series of buttons or other input devices on the device, application of a touch input at one or more particular locations of a touch screen, a particular force applied to the touch screen, utterance of a word or sound received by a microphone of the device, and/or any interaction with the mobile device 102 that has been pre-specified as the user secret 118.

The user may enter the user secret 118 directly onto the mobile device 102, may enter the user secret 118 via the external wireless communications device 116, or may enter the user secret 118 in any other manner. Furthermore, in some implementations, an entity other than (or in addition to) the user may enter or otherwise provide the secret. This entity could comprise another user or another device or system, or any combination thereof.

Before allowing the user 110 to access a particular content item 112, the mobile device 102 checks to make sure that the entered passcode 118 matches the preset or configured passcode of the mobile device 102. If the entered passcode 118 does not match, the user 110 is not allowed to access the requested content item. Thus, access to the particular content item 112 is predicated upon receiving a password or user secret 108 from the user 110 that corresponds to a pre-specified password.

In addition to such passcode protection, access to the particular content item 112 is predicated or conditioned upon receiving a wireless communications signal from the external wireless communications device 116 that has been pre-associated with the user 110. As already described, this wireless communications signal may be a Bluetooth signal, a wireless networking signal, or some other data communication signal that can be verified as originating from the user's external wireless communications device 116. Verifying that the signal originates from the user's wireless communications device 116 may comprise communicating bi-directionally with the external wireless communications device 116. In the context of Bluetooth technology, this may include the ability to "pair" with the external wireless communications device 116, or to establish a "pairing" of the mobile device 102 and the external wireless communications device 116. In the context of wireless networking, verification may involve determining that the mobile device 102 is able to properly authenticate with the external wireless communications device 116 using appropriate security and encryption protocols, such as WPA, WEP, SSH, or IPSEC protocols.

Figure 2:
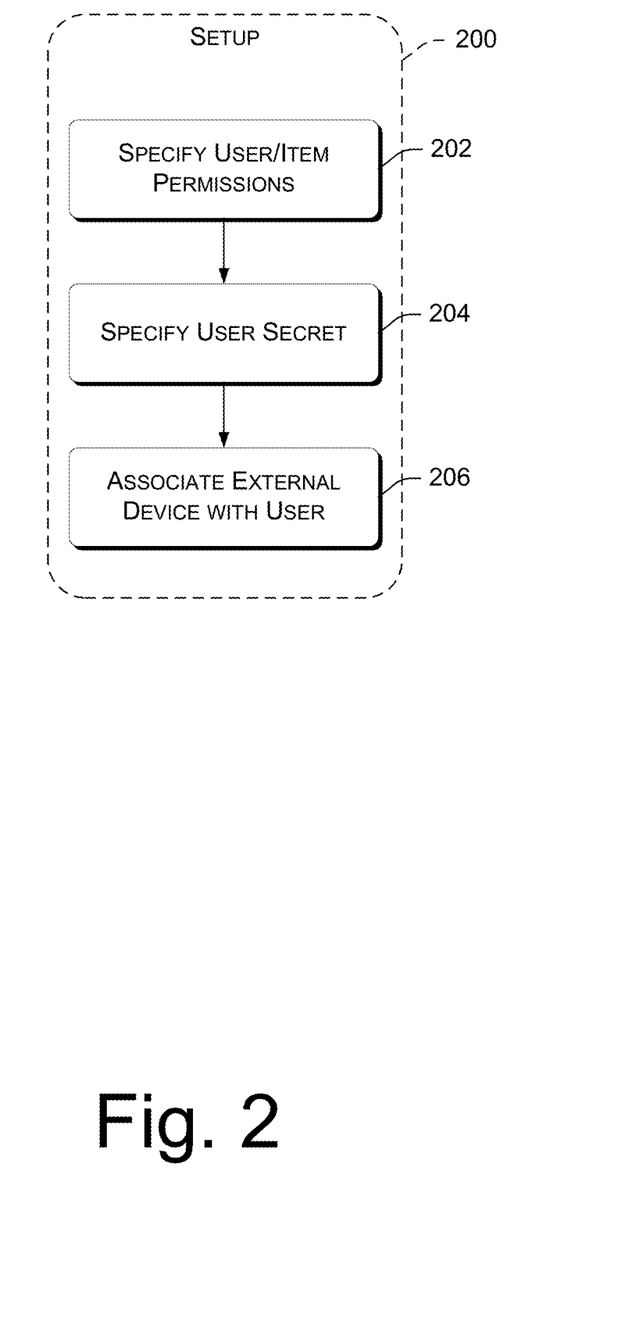
FIGS. 2 and 3 are flowcharts showing example procedures for authenticating a user and securing mobile device content.
Figure 3:
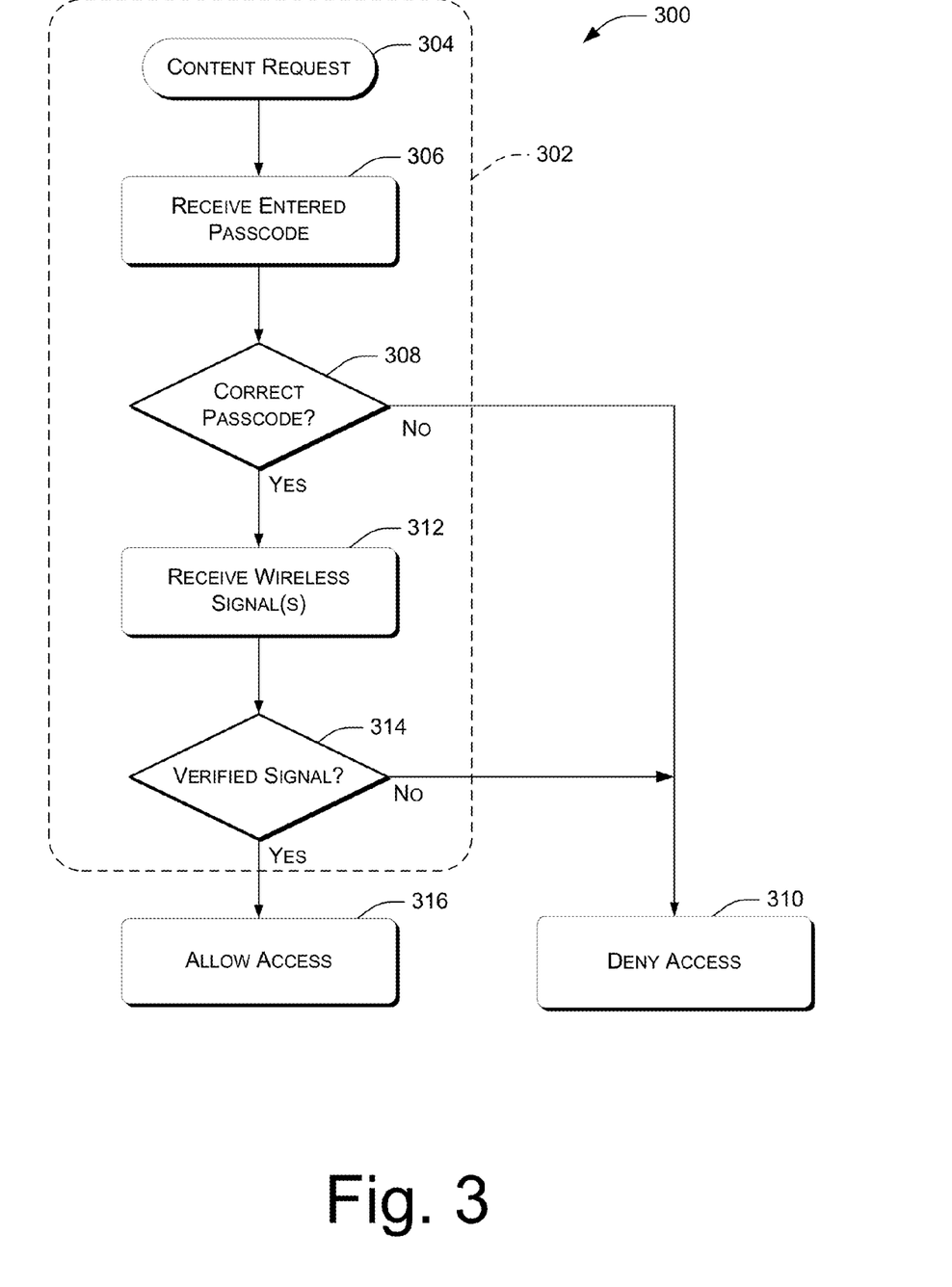

FIGS. 2 and 3 illustrate actions performed in order to access content items on mobile device 102. For ease of understanding, the processes shown in FIGS. 2 and 3 are delineated as separate acts or operations represented as independent blocks. However, these separately delineated acts should not be construed as necessarily order dependent in their performance. The order in which the process is described is not intended to be construed as a limitation, and any number of the described process blocks maybe be combined in any order or in parallel to implement the process, or an alternate process. Moreover, it is also possible that one or more of the provided process blocks be omitted. For purposes of discussion, the processes will be described in the context of environment 100 described with reference to FIG. 1.

FIG. 2 illustrates setup actions 200, comprising an action 202 of specifying user/item permissions, an action 204 of pre-specifying a user secret, and an action 206 of associating one or more external devices with a user.

The action 202 comprises setting up user permissions for individual content items 112 or groups of content items 112. Such permissions might be specified and established by a content provider at the time a content item is provided to the mobile device 102, based on licensing or usage rights. Alternatively, the user 110 might specify certain content items that only the user 110 can access or that only certain other users are allowed to access.

As an example, the user 110 might purchase an eBook from a content provider. The content provider might impose certain restrictions on usage of the eBook, such as limiting its access to a group of users comprising the family of the user 110. When reading the eBook, the user 110 may create a new content item comprising notes and annotations relating to the eBook. The user 110 might specify that only he or she is permitted to access the notes and annotations. Such permissions can be specified through an appropriate user interface utilizing the keys 104 and the display 106.

The action 204 of specifying or pre-specifying the user secret 118 comprises establishing a passcode or password to be associated with the device 102 or with the user 110 and/or other users of the mobile device 102. The user secret 118 can be established during setup of the mobile device 102 and potentially changed by the user 110 at different times. In other implementations, the action 204 comprises pre-specifying biometric information (e.g., a fingerprint, a retinal scan, etc.) with the user. Furthermore, a device may be used by multiple different people and, as such, may be associated with multiple different user secrets and/or with multiple different pieces of biometric information.

The action 206 of associating an external device 116 with the user 110 comprises connecting with the external device 116 and selecting that device as an authentication factor. As described above, the external device 116 can be a communications device, and can be a device that is personal to the user 110, such as a cellular telephone, a wireless headset, a personal music player, etc.

During setup of the mobile device 102, the user 110 might be presented with a list of detected external devices. For example, such a list might include several detected wireless access points, one or more Bluetooth accessories, a Bluetooth equipped phone, a personal media player having wireless networking capabilities, etc. In some embodiments, the user 110 is asked to select one or more of such devices that belong to or are normally present along with the user 110. In response, the mobile device 102 records an association between the user 110 and the indicated device.

Alternatively, a content provider might specify a particular external wireless device 116 as being associated with the user 110 for purposes of temporary user authentication. For example, selling or renting a particular external wireless device 116 to a user 110 might give that user access rights to some particular content or content items 112. Access to those content items would be premised upon the mobile device 102 being able to detect the presence or proximity of the external wireless device 116.

As another example, a content provider might provide a content item 112 such as a movie, limited to access only by certain users who have been granted access to a network component, such as a particular wireless access point. In this situation, the access point is associated with the user 110 and access to the content is permitted only if the mobile device 102 is able to detect the presence or proximity of the access point. One situation where this might be useful is when wirelessly distributing content within an airplane or some other transportation vehicle, or within any other particular location that includes a network component transmitting a wireless signals. Using the example of an airplane, a user who purchases the content might be associated for purposes of authentication with a wireless access point or distribution transceiver within the airplane. As long as the user's mobile device 102 can detect the physical presence or proximity of the access point, the user is permitted access to the content. When the access point can no longer be detected, the user is denied access to the content.

FIG. 3 illustrates a method 300 of authenticating a user of a mobile or portable device, and of accessing content items on the device. That is, this figure illustrates a method of controlling accessing to a mobile or portable device, which may comprise controlling access to any programs, data, applications, or any other information or subset of information stored on or accessible by the device. Authentication procedures are shown within block 302.

Generally, successful authentication is predicated upon (a) receiving an entered password 118 corresponding to a pre-specified password and (b) receiving a wireless signal and verifying that the received wireless signal is from the separate electronic device 116 that has been pre-associated with the user 110 of the mobile device 102. In some instances, successful authentication may be predicated upon receiving a valid password and receiving multiple different wireless signals from respective separate electronic devices.

More specifically, block 304 represents receiving a request by the user 110 to access or render a particular content item 112. It is assumed in this example that the requested content item 112 has been protected against unauthorized access by associating it with a particular user 110, or with multiple such users. It is also assumed that the procedures of FIG. 2 have already been performed with respect to the requested content item and the users authorized to access the content item.

An action 306 comprises prompting the user 110 for the user secret or password 118 that has been previously established for this user and receiving the password entered by the user 110. In practice, a prompt might be presented on the display 108, instructing the user 110 to enter the password 118. The user 110 uses keys 106 to enter the password. In some embodiments, however, the user 110 may speak the password into a microphone of the device, or the user may enter the password in any other suitable manner.

At 308, the mobile device 102 determines whether the entered password matches the password previously established for this user. If the entered password does not match the previously established or pre-specified password, authentication fails and the mobile device 110 denies access to the requested content item at 310. If the entered password does match the previously established password, further authentication is performed at 312.

Action 312 comprises receiving one or more analog or digital wireless communications signals. As already described, at least one of the received wireless signals is expected to be a signal originating from the external device 116 associated with the user 110. The signal might be an identifiable wide-area or local-area networking signal such as a wireless networking or WiFi signal. Alternatively, the signal might be a Bluetooth signal or some other wireless signal used by an external wireless accessory or independent communications device. In some embodiments, the wireless communications signal is a signal that can be verified as originating from a particular wireless communications device.

Action 314 comprises determining whether at least one of the received signals is from the external wireless device 116 that has been pre-associated with the user 110. Such determining or verifying can be accomplished by detecting characteristics of the received wireless signal or data conveyed by the wireless signal. A wireless networking signal, for example, often conveys a unique network name or device identifier that can be used to verify that the signal is from a particular device. Bluetooth signals, similarly, convey device identifiers that can be used to verify that a signal is from a particular device or type of device.

Furthermore, the verification 314 can be based upon successful bi-directional communications with the external device from which the received signal emanates. In the case of WiFi or Bluetooth signals, for example, verification can be premised upon the ability to establish a communications channel with the external wireless device 116. This adds a further degree of protection since some current or previous user setup is often needed in order for such a communications channel to be established, such as entering a code or password associated with the external device 116.

If none of the received wireless signals is from the external device 116 that has previously been associated with the authorized user 110, authentication fails and the mobile device 102 denies access to the requested content item at 310. If at least one of the received wireless signals is from the external device 116 that has previously been associated with the authorized user 110, authentication is declared to be successful, and the mobile device 102 permits access to the requested content item at 316. While FIG. 3 illustrates receiving an entered passcode at 306 prior to receiving a wireless signal at 312, these operations may occur in the opposite order or in parallel in other implementations.

Using the authentication 302 of FIG. 3, two authentication factors are provided: a user-knowledge factor (the password), and a user-possession factor (proximity of the pre-associated external wireless device). In other implementations, meanwhile, the user may provide proof of who the user is (biometric information, such as a fingerprint, a retinal scan, etc.), along with the user-possession factor.

Figure 4:
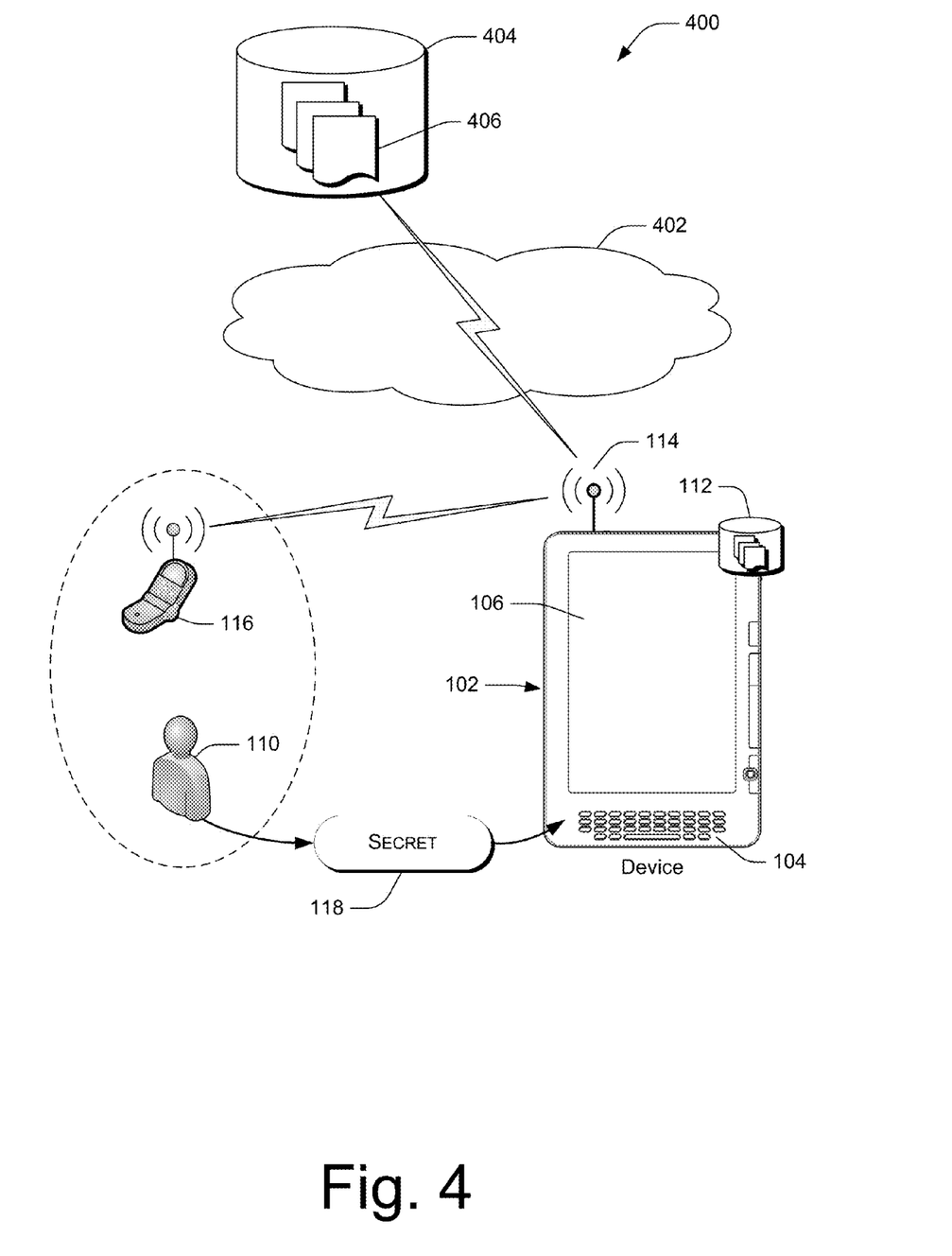
FIG. 4 is a block diagram illustrating another example implementation of an architecture in which a mobile device utilizes an external wireless device for user authentication.

FIG. 4 shows an alternative environment 400 in which the techniques described above can be implemented. This embodiment includes elements of FIG. 1, including the mobile device 102, the user 110, the external wireless device 116, and the user secret 118. Similar elements have been designated with the same reference numerals used in FIG. 1.

In this example, the wireless communications receiver or transceiver 114 is a wireless local-area or wide-area network transceiver configured to communicate through a local-area or wide-area network to receive electronic media for storage and rendering on the mobile device 102. In the illustrated example, in which the mobile device 102 is an eBook reader device, the received media comprise eBooks.

The wireless communications receiver or transceiver 114 of the mobile device 102 can be a Wi-Fi receiver, transceiver, or port, configured to use conventional IP and IP-related protocols for wireless network communications. The wireless communications receiver or transceiver 114 can communicate with various web sites, resources, and content providers through a public or private network infrastructure 402 such as the Internet, a proprietary voice and/or data communications infrastructure, or some combination thereof.

This environment 400 can include a media or content source 404 from which individual media items 406 can be obtained. This might be some type of service provider, database, storage cache, or other source from which content items can be streamed or downloaded. The wireless communications receiver or transceiver 114 is configured in this example to receive electronic media for storing and/or rendering on the mobile device 102.

Thus, in this embodiment, a single wireless receiver or transceiver 114 is used to both (a) communicate with a content provider and receive content items from the content provider, and (b) verify presence or proximity of an external wireless device 116 that has been pre-associated with the user 110. Note, however, that other embodiments may have two or more wireless receivers or transceivers 114, and might use two different wireless receivers or transceivers 114 for communicating with a content provider and verifying an external wireless device, respectively.

Figure 5:
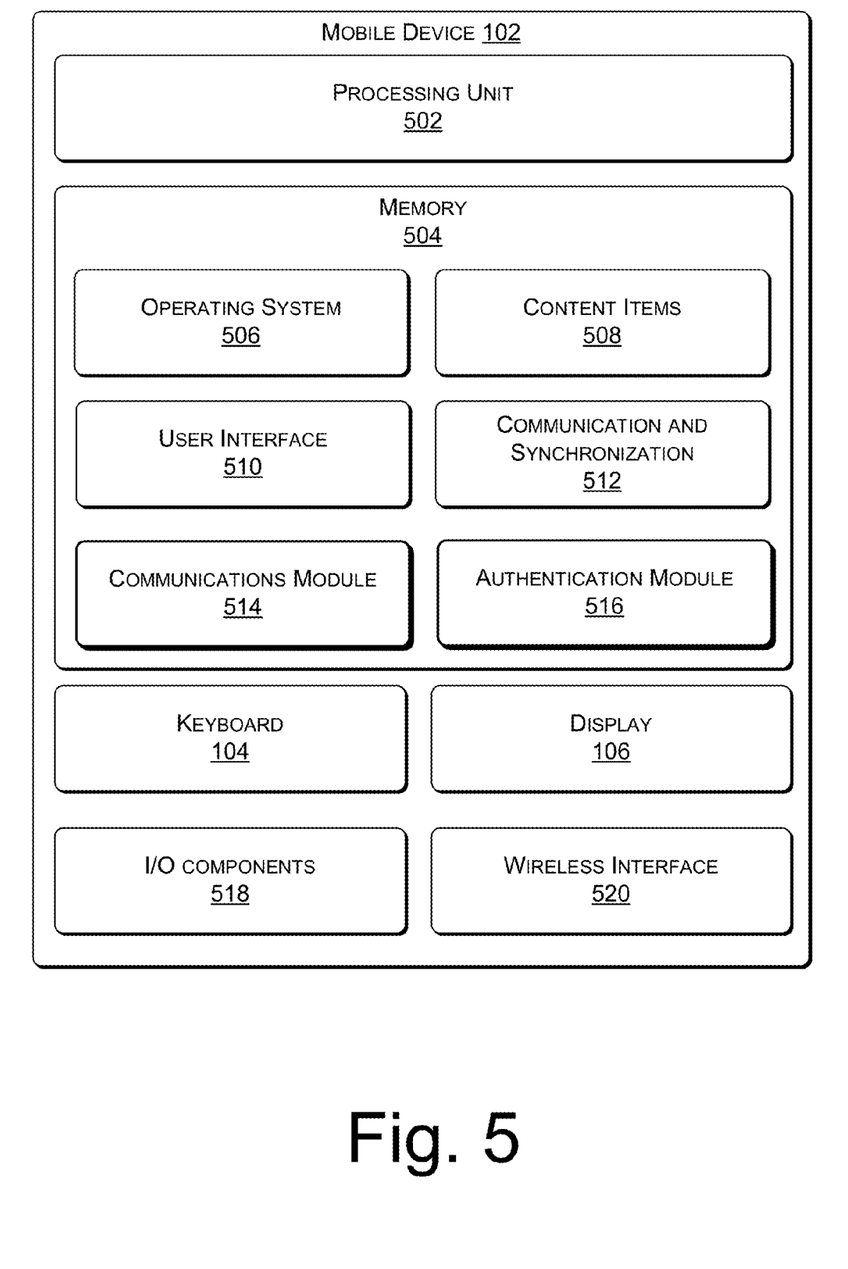
FIG. 5 is a block diagram illustrating example components of the mobile device shown in FIGS. 1 and 4.

FIG. 5 illustrates example components that might be implemented in the mobile device 102. In the embodiment shown in FIG. 5, the mobile device 102 may be a dedicated, handheld eBook reader device equipped with a passive display, such as a reflective display, to display electronic documents, such as electronic books or "eBooks". Of course, other implementations may employ any other type of display, as an emissive display, a projection display, and/or the like. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages etc. Accordingly, the terms book and/or eBook may include any content that is in electronic or digital form.

In a very basic configuration, the mobile device 102 includes a processing unit 502 composed one of one or more processors, and memory 504. Depending on the configuration of the mobile device 102, the memory 504 is an example of computer storage media and may include volatile and nonvolatile memory. Thus, the memory 504 may include, but is not limited to, RAM, ROM, EEPROM, flash memory, or other memory technology, or any other medium which can be used to store media items or applications and data which can be accessed by the mobile device 102.

The memory 504 may be used to store any number of functional components that are executable on the processing unit 502, as well as data and content items that are rendered by the mobile device 102. Thus, the memory 504 may store an operating system 506 and an eBook storage database to store one or more content items 508, such as eBooks and audio books.

A user interface module 510 may also be provided in memory 504 and executed on the processing unit 502 to facilitate user operation of the mobile device 102. The UI module 510 may provide menus and other navigational tools to facilitate selection and rendering of the content items or eBooks 508. The UI module 510 may further include a browser or other application that facilitates access to sites over a network, such as websites, content providers, or online merchants.

A content presentation application 512 renders the content items 508. The content presentation application 512 may be implemented as various applications depending upon the content items. For instance, the application 512 may be an electronic book reader application for rending electronic books, or an audio player for playing audio books, or a video player for playing video, and so forth.

The memory 504 may further store a network communication module 514 to manage communication between the mobile device 102 and other devices or entities, such as the external wireless device 116, network 402, and/or content source 404 (FIGS. 1 and 4).

The mobile device 102 in this environment may also include an authentication module or logic component 516 responsible for performing and coordinating the authentication procedures described above in conjunction with other components of the mobile device 102. In particular, authentication module 516 can be configured to condition or predicate access to or rendering of a particular content item based on successful authentication of a user who has been pre-authorized for access to the particular content item. Successful authentication, in turn, is conditioned or predicated in part upon receiving a wireless signal from an external wireless device that has been pre-associated with the authorized user. In some embodiments, successful authentication is further conditioned or predicated upon verifying that the received wireless signal is from the particular external device that has been associated with the user, such as by authenticating with the external device or communicating bi-directionally with the external device.

The authentication module 516 can be configured to additionally condition or predicate access to a particular content item on a factor other than receiving the wireless signal from the external electronic device, such as receiving a user-entered password matching a pre-defined password.

The mobile device 102 may further include the keyboard 104 and the display 106. In the case where the mobile device 102 is an eBook reader device, the display 106 can use ePaper display technology, which is bi-stable, meaning that it is capable of holding text or other rendered images even when very little or no power is supplied to the display. Some example ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

The mobile device 102 may further be equipped with various other input/output (I/O) components 518. Such components may include various user interface controls (e.g., buttons, joystick, etc.), audio speaker, connection ports, and so forth.

One or more wireless communication devices or interfaces 520 are provided to facilitate communication with external, remote computing sources over various networks, such as the network 402, or with other local devices such as the external wireless device 116. Content (e.g., eBooks, magazines, audio books, etc.), as well as program modules, may be transferred to the mobile device 102 via the communication interfaces(s) 520. The communication interface(s) 520 can support connections to various networks, such as cellular networks, radio, WiFi networks, short range networks (e.g., Bluetooth), IR, and so forth. The communication interfaces(s) 520 can support both wired and wireless communications with various types of networks (e.g., network 106), including the Internet.

The eBook reader device 102 may have additional features or functionality. For example, the eBook reader device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   receiving, by a first device, a user secret;
   determining, by the first device, that the user secret matches a previously stored user secret associated with a user;
   receiving, by the first device, one of a local area wireless communications signal or a Bluetooth signal originating from a second device associated with at least one of the user or a content item;

determining, by the first device, based at least partly on the user secret and on an attribute of one of the local area wireless communications signal or the Bluetooth signal, to grant access to the content item; and granting, by the first device, permission to access the content item on the first device.

2. The method of claim 1, further comprising:

determining a loss of one of the local area wireless communications signal or the Bluetooth signal; and revoking access to the content item on the first device based at least in part on the loss of the at least one of the local area wireless communications signal or the Bluetooth signal.

3. The method of claim 1, wherein the attribute of the one of the local area wireless communications signal or the Bluetooth signal comprises an indication that a content provider has authorized access rights to the content item for a subset of users who have access to a network component.

4. The method of claim 3, wherein the network component is a wireless access point located within a vehicle.

5. The method of claim 1, wherein the attribute of the one of the local area wireless communications signal or the Bluetooth signal indicates that the user has purchased access rights to the content item.

6. A mobile device comprising:

a display;

a wireless communications receiver; and non-transitory computer-readable media storing one or more modules, the one or more modules including computer-readable instructions that when executed by a processor perform operations comprising:

receiving, by the mobile device and via the wireless transceiver, one of a local area wireless communications signal, an acoustic signal, or a Bluetooth signal;

determining, by the mobile device, that the one of the local area wireless communications signal or the Bluetooth signal originated from an external device that has been previously associated with the mobile device; and granting, by the mobile device, permission to access a content item on the mobile device based at least in part on a determination that the one of a local area wireless communications signal or a Bluetooth signal originated from the external device associated with the mobile device.

7. The mobile device of claim 6, wherein the content item is provided by the external device and granting permission to access the content item on the mobile device is temporary.

8. The mobile device of claim 6, wherein granting permission to access the content item on the mobile device is further based on a determination that authentication information received by the mobile device matches authentication information stored on the mobile device.

9. The mobile device of claim 8, wherein the authentication information stored on the mobile device is a user secret or biometric information.

10. The mobile device of claim 6, wherein determining that the one of the local area wireless communications signal or the Bluetooth signal originated from the external device that has been previously associated with the mobile device comprises verifying that the one of the local area wireless communications signal or the Bluetooth signal includes identification information identifying the external device.

11. The mobile device of claim 6, wherein the mobile device is an electronic book reader and the content item is an electronic book.

12. The mobile device of claim 6, wherein the external device is at least one of an audio device, an electronic headset, or a mobile communications device.

13. One or more non-transitory computer-readable storage devices storing computer-readable instructions that, when executed by one or more computer processors of a mobile device, perform operations including:

receiving, by the mobile device, authentication information;

determining, by the mobile device, that the authentication information matches additional authentication information stored on the mobile device;

receiving, by the mobile device, one of a local area wireless communications signal or a Bluetooth signal;

determining, by the mobile device, that the one of the local area wireless communications signal or the Bluetooth signal originated from an external device associated with the user; and granting, by the mobile device, permission to access a content item on the mobile device.

14. The one or more non-transitory computer-readable storage devices of claim 13, the operations further comprising receiving, by the mobile device and from a content provider of the content item, an indication that the external device is associated with the user.

15. The one or more non-transitory computer-readable storage devices of claim 13, the operations further comprising:

detecting, by the mobile device, a presence of the external device;

displaying, by the mobile device, a user interface (UI) that includes a UI element selectable to associate the external device with the mobile device;

receiving, by the mobile device, a selection of the external device; and storing, on the mobile device and based on the selection, an association between the external device and the mobile device.

16. The one or more non-transitory computer-readable storage devices of claim 15, the operations further comprising:

receiving, by the mobile device, a password for accessing the external device; and establishing, by the mobile device and based at least in part on receiving the password, a communications channel with the external device.

17. The one or more non-transitory computer-readable storage devices of claim 16, the operations further comprising:

determining, by the mobile device, that the one of the local area wireless communications signal or the Bluetooth signal originated from the external device based at least in part on establishing the communications channel with the external device.

18. The one or more non-transitory computer-readable storage devices of claim 13, the operations further comprising:

determining, by the mobile device, that the one of the local area wireless communications signal or the Bluetooth signal originated from the external device based at least in part on receiving a device identifier from the external device.

19. The one or more non-transitory computer-readable storage devices of claim 13, the operations further comprising:

accessing, by the mobile device, multiple user permissions, wherein different user permissions correspond to different users of the mobile device, the multiple user permissions specify types of access to respective content items, and the content item is one of the respective content items; and determining, by the mobile device and based at least partly on the multiple user permissions, that the user has permission to access the content item on the mobile device.

20. The one or more non-transitory computer-readable storage devices of claim 13, wherein the additional authentication information includes an indication of a particular amount of force applied to a touch-sensitive display on the mobile device, and wherein receiving the authentication information includes receiving a force applied to the touch-sensitive display.

* * * * *